United States Patent [19]

Rigby et al.

[11] Patent Number: 4,889,631

[45] Date of Patent: Dec. 26, 1989

[54] ANODIC ALUMINIUM OXIDE MEMBRANES

[75] Inventors: William R. Rigby; Robin C. Furneaux; Anthony T. Thomas, all of Banbury, England

[73] Assignee: Alcan International Limited, Montreal, Canada

[21] Appl. No.: 39,477

[22] Filed: Apr. 16, 1987

[30] Foreign Application Priority Data

Apr. 16, 1986 [GB] United Kingdom ............... 8609250

[51] Int. Cl.$^4$ .............................................. B01D 25/00
[52] U.S. Cl. .................................. 210/493.1; 210/496; 210/500.25; 428/409; 428/701
[58] Field of Search ....................... 210/500.25, 500.26, 210/496, 510.1, 493.1, 487; 428/409, 182, 701; 204/11, 12, 24

[56] References Cited

U.S. PATENT DOCUMENTS

| | | | |
|---|---|---|---|
| 3,037,637 | 6/1962 | Bub | 210/487 |
| 3,401,798 | 9/1968 | Nyrop | 210/487 |
| 3,520,357 | 7/1970 | Bruner | 204/11 |
| 3,671,410 | 6/1972 | Stahr | 204/56.1 |
| 3,850,762 | 11/1974 | Smith | 204/11 |
| 4,177,228 | 12/1979 | Prölss | 210/500.25 |
| 4,569,878 | 2/1986 | Barrall et al. | 428/182 |
| 4,687,551 | 8/1987 | Furneaux et al. | 204/11 |

FOREIGN PATENT DOCUMENTS 2444541 6/1975 Fed. Rep. of Germany.

OTHER PUBLICATIONS

R. W. Thomas, "Studies of the Barrier Layer and Spontaneous Separation of Porous Anodic Coatings from the Metal Substrate", Trans. Inst. Metal Fin., 1976, 54, 80–90.

Primary Examiner—W. Gary Jones
Assistant Examiner—Coreen Y. Lee
Attorney, Agent, or Firm—Cooper & Dunham

[57] ABSTRACT

A porous anodic aluminum oxide membrane, at least one surface of which is profiled on a scale of 0.01 to 50 mm, may be made by profiling a surface of an aluminium metal substrate anodizing the substrate to form a porous membrane on the surface and separating the membrane from the substrate. The profiling may consist of a system of parallel ribs and troughs. Structure having an interesting properties as filters can be built up by the use of several such membranes bonded to one another along the crests of the ribs.

9 Claims, 1 Drawing Sheet

ANODIC ALUMINIUM OXIDE MEMBRANES

EPA 178831 describes anodic aluminium oxide membranes having pores extending from one face of the membrane to the other, including a system of larger pores extending in from one face and a system of smaller pores extending in from the other face, the system of larger pores interconnecting with the system of smaller pores, such that the inner ends of one or more smaller pores are joined to the inner end of a larger pore and there are substantially no blind larger pores. These membranes have advantageous properties for use as filters. In particular, they can be arranged to have high porosity, thus enabling good particulate retention properties to be combined with high flow-through rates. The membranes can be formed by separating conventional anodic aluminium oxide membranes from their metal substrate by a slow voltage reduction technique, designed to thin the barrier layer and eventually to dissolve any remaining barrier layer at the metal/oxide interface. Filter devices are designed to include the maximum filter surface area per unit volume. Anodic oxide membranes produced from flat metal substrates are themselves flat and do not lend themselves very well to maximising filter surface area per unit volume.

German Patent Specification 2,444,541 describes a method for producing a thick self-supporting porous anodic aluminium layers by anodising an aluminium substrate in oxalic acid. It is observed that irregular or unusual (anodic aluminium oxide membrane) shapes can be produced in a simple manner by bending or pressure forming aluminium or aluminium alloy sheets According to the present invention there is provided an anodic aluminium oxide membrane, at least one surface of which is profiled on a scale of 0.005 or 0.01 to 50 mm. Membranes according to the invention can be incorporated in filter devices to provide a greater filter surface area per unit volume than is possible using flat membranes. In addition, membranes of the invention can be incorporated in novel filter designs similar to hollow fibre systems.

Profiling involves creating at least one convex region and at least one concave region, and generally many convex and concave regions, on a surface. When we say that a surface is profiled on a scale of 0.005 to 50 mm, we mean that the distance between two adjacent concave regions, or two adjacent convex regions, is on average in this range.

At least one surface, and generally both surfaces, of the membranes of this invention are profiled. This profiling is macroscopic, but small scale, and should not be confused either with the microscopic surface roughness of all anodic oxide membranes resulting from the solvent action of the electrolyte in which they are formed, or with the large scale effects that may result from bending aluminium sheet. Preferably the profiling comprises a plurality of interspersed peaks and valleys or dimples which may or may not be elongated on the surface of the membrane, wherein the average distance D between the peaks is from 0.01 to 50 mm, preferably 0.1 to 10 mm, and the average height of the peaks above adjacent valleys is at least 0.1D, preferably at least 0.2D. Anodic oxide membranes conform to the metal substrate on which, and out of which, they are formed. Membranes having the defined profiled surface can thus be formed simply by anodizing an aluminium metal substrate having a surface with a corresponding profile.

Metal substrates can be given desired profiled by various known techniques, including - separately or in combination:
   machining;
   pressing between suitably shaped dies;
   rolling between contoured rolls;
   etching, which can provide a rippled effect;
   abrasion, shot-peening or grit blasting.
Depending on the technique used, the profiled surface may be random or pre-determined.

The crests of ribs and bottoms of troughs can under some circumstances provide lines of weakness when the anodic oxide film is removed from the substrate. This is particularly true when the difference in height between ribs and valleys is great in relation to the spacing of the ribs. Surface finish of the metal substrate on a microscopic scale is important, and should be preferably as smooth as possible. A smooth surface finish on a profiled substrate can be achieved by chemical means, for example, by a caustic etch or electropolishing; or by mechanical means such as for example polishing. Chemical etching can have the effect of making the crests of the ribs sharper, but this surprisingly does not necessarily make the anodic oxide membrane more difficult to remove.

Although non-porous membranes are of some interest, for use for example as catalyst supports, membranes according to this invention are preferably porous, having interconnecting pores extending from both major surfaces substantially at right angles to the surface. The thickness of the membranes is preferably substantially uniform, which implies corresponding profiles on both major faces, and is preferably in the range of 0.1 to 100 microns. The pores preferably have diameters in the range of 2 nm to 2 microns (1000 nm32 1 micron). The pores may be of generally cylindrical form extending at substantially uniform diameter all the way through the membrane. Preferably, however, the membrane includes a system of larger pores extending in from one face of the membrane interconnecting with a system of smaller pores extending in from the other face, as described in EPA 178831.

The interspersed peaks and valleys which constitute the surface profiles of the membranes, may be of any shape and may be distributed randomly or regularly. In one preferred embodiment of the invention, the peaks and valleys comprise alternating elongated ribs and troughs. These may be generally linear and parallel to one another and arranged at regular spacings. Thus, for example, the spacing D between adjacent ribs may be from 0.1 to 50 mm, preferably 0.1 to 10 mm, and the depth of the troughs between the ribs may be from 0.1D up to 1.0D or even greater. It will be appreciated that the crest of a rib on one surface of the membrane corresponds to the bottom of a trough on the other surface. Because sharp crests can under some circumstances provide lines of weakness, it may be preferred to make the crests of the ribs, and correspondingly the bottoms of the trenches, rounded rather than sharp. The surface profile is preferably such that a pieces of a membrane according to this invention, has a surface area which is at least 10% greater than the surface area of a corresponding piece of a conventional flat membrane. Corrugated membranes of this kind may have improved self-cleaning properties, when fluid is directed across the corrugations, compared to conventional flat membranes.

Membranes according to this invention may be made simply by anodizing an aluminium metal substrate having the necessary surface profile in an electrolyte, such as sulphuric or phosphoric acid, that forms porous anodic oxide membranes, and then separating the membrane from any remaining metal substrate. Various separation techniques are available:

(a) The voltage reduction technique described in EPA 178831. This is the preferred technique and gives rise to the preferred membranes in which a system of larger pores extends in from one face and interconnects with a system of smaller pores extending in from the other face.

(b) A somewhat similar technique is described by R.W.Thomas in Trans. Inst. Metal Fin., 1976,54, 80 to 90, and involves dissolving away the barrier layer so as to give a membrane having essentially uniform parallel pores.

(c) A method of etching away the metal substrate and the barrier layer by means of hydrochloric acid is described in US 3850762, and results in a membrane having essentially parallel cylindrical pores.

(d) A method of dissolving the metal substrate in an aqueous solution of mercuric chloride is described in US 3626233.

(e) The metal substrate can be dissolved in bromine/methanol, followed if desired by further treatment to dissolve the barrier layer.

The porous membranes thus far described are useful as filter elements in their own right, the fluid to be filtered being applied to one major surface of the membrane and the filtrate recovered from the other surface. However, such an arrangement may be somewhat wasteful of space in a filter device. In another aspect, this invention also includes a structure comprising two anodic aluminium oxide membranes including one such membrane at least one surface of which comprises a plurality of alternating elongated ribs and troughs and which is bonded to the other membrane along the crests of the ribs for example by an adhesive or inorganic cement.

For use as filters, one or both membranes need to be porous. The other membrane can be of the conventional flat sort. More preferably, however, both membranes have corresponding systems of alternating elongated ribs and troughs and are bonded together along the crests of their respective ribs. When the ribs and troughs are generally linear and parallel to one another, the resulting structure has a form equivalent to a row of hollow fibres. Structures equivalent to bundles of hollow fibres can be formed from more than two membranes. For example, one useful structure comprises a plurality of flat membranes and a plurality of membranes according to this invention with alternating parallel elongated ribs and troughs, the two sets of membranes being stacked alternately one on top of the other and being bonded together along the crests of the ribs. The flat membranes can be porous or non-porous. The gaps between the ribbed membranes and the flat ones constitute tubes, which can be arranged, either with all layers parallel, or for example with alternate layers extending at an angle to one another. In another similar structure the membranes with alternating parallel elongated troughs and ribs are replaced by membranes with alternating peaks and valleys or dimples, which are attached to the flat membranes at isolated spots rather than along continuous lines. Yet another structure comprises a plurality of membranes according to this invention having alternating parallel elongated ribs and troughs, the membranes being stacked and bonded together along the crests of their respective ribs. Such structures can have a high filter surface area per unit volume. In such structures, the passages between adjacent membranes constitute tubes. The structures can be used in the same way as conventional hollow fibre filter systems, by providing a bundle of tubes, introducing a fluid to be filtered into the tubes and recovering a filtrate from the region between the tubes. Or the system can be operated the other way round, by introducing the fluid to be filtered into the region between the tubes and recovering the filtrate from the tubes, and this may be preferable where it is desired to maintain a substantial pressure difference across the filter since the tubes are much more resistant to pressure on the convex side than on the concave side.

Reference is directed to the accompanying drawings in which.

Figure 1:
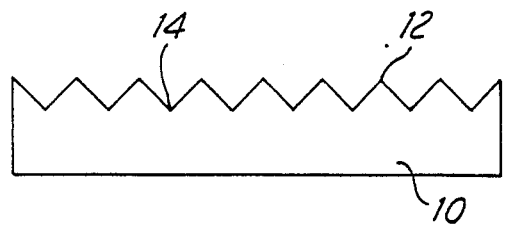
FIGS. 1 to 3 show various stages in the production of a membrane according to the invention, FIG. 3 being a section through the membrane so produced.
Figure 2:
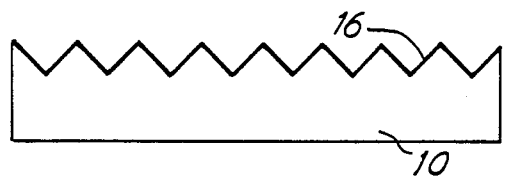

Referring to the drawings, FIG. 1 shows an aluminium metal substrate 10 whose surface is formed of alternating parallel ribs 12 and troughs 14, which extend perpendicular to the plane of the paper. FIG. 2 shows the same metal substrate 10 after anodizing, carrying an anodic aluminium oxide membrane 16 whose shape conforms to the surface of the substrate.

Figure 3:
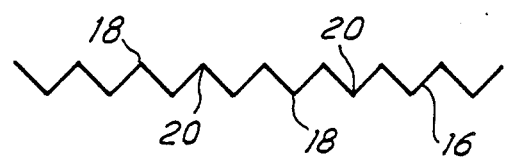

FIG. 3 shows the membrane after removal of the substrate. Each surface comprises alternating ribs 18 and troughs 20, with the ribs of one surface corresponding to the troughs of the other and vice versa. Both the crests of the ribs and the bottoms of the troughs are shown as sharp right-angles. As a result, the surface area of the membrane is 1.4 x the surface area of a conventional flat membrane of the same overall size.

Figure 4:
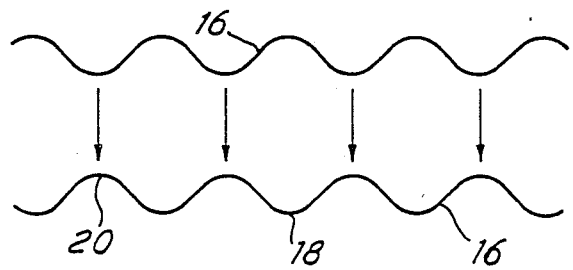
FIG. 4 is a section through two alternative membranes according to the invention.
Figure 5:
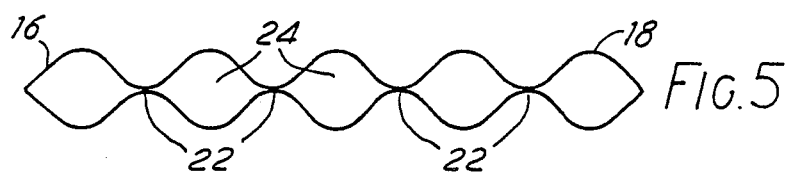
FIG. 5 and 6 are sections through structures formed of two or more membranes bonded together.

FIG. 4 shows two further membranes according to the invention, in which the crests of the ribs and the bottoms of the troughs have been rounded. FIG. 5 shows a structure formed by stacking one membrane on top of the other and bonding the two together where they touch at 22 along the crests of their respective ribs. The resulting structure comprises a row of tubes 24.

Figure 6:
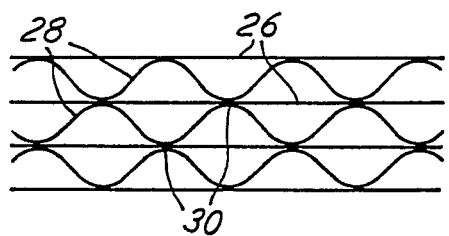

FIG. 6 shows a structure formed of seven membranes, four of which are flat membranes 26 which may be porous or non-porous. Interposed between these are membranes 28 according to this invention, whose profile is that shown in FIG. 4. The ribbed membranes 28 are bonded to the flat membranes 26 along the crests of the ribs at 30 where the two are in contact.

EXAMPLE 1

A 5 cm by 5 cm by 0.3 mm flat aluminium panel was machined to the saw-tooth topography shown in FIG. 1, with adjacent ribs spaced approximately 2 mm apart and separated by troughs approximately 1mm deep. The sample was then anodized using 0.4 M $H_3PO_4$ at 25° C. to give an anodic oxide membrane 30 microns thick. The membrane was separated from the metal substrate by the voltage reduction technique described in EPA 178831. The resulting anodic aluminium oxide membrane exhibited a saw-tooth topography corresponding to the substrate. The membrane was porous with a system of larger pores extending in from one face and interconnecting with a system of smaller pores extending in from the other face. The crests of the ribs were areas of weakness at which the films tended to crack more easily than elsewhere.

EXAMPLE 2

99.99% super purity aluminium panels (15×50 cm) were machined to produce alternating parallel ribs and valleys to the following specifications:-

(a) Ribs spaced 1.5 mm apart; height different between crests of ribs and bottoms of valleys is 0.5 mm; radius of curvature at crests of ribs and bottoms of valleys is 0.3 mm.

(b) Ribs are spaced 1.5 mm apart; height of crests of ribs above bottoms of valleys is 0.25 mm; radius of curvature at bottoms of valleys and crests of ribs is 0.4 mm.

Each panel was then cut into smaller panels (15×7.5 cm) for the following experiments.

(1) To produce a ribbed membrane from ribbed aluminium panel (a). A panel was degreased using an alkaline detergent wash. The panel was then anodized using standard conditions to produce a film of 60 micron thickness. The film was then subjected to the voltage reduced technique described in EPA 178831. An attempt was then made to lift the film by immersion in 33% phosphoric acid for 4 minutes.

The film was observed not to lift in whole sections but to produce thin membrane strips where the film had cracked along ribs. Repeat anodizing runs with the sample panel failed to overcome the problem.

(2) A panel was etched in a caustic soda/sodium nitrate mixture for 60 minutes. The panel was then anodized and the film produced was subjected to the voltage reduction and lifting procedures previously described. The anodic oxide film was observed to lift from the substrate resulting in large pieces of ribbed membrane.

Microscope investigation of sections of the ribbed panel showed that the etch had dissolved the aluminium principally in the valleys resulting in ribs with more acute crest than previously.

(3) To produce a ribbed membrane from a panel (b). A panel was anodized and the film produced was subjected to the voltage reduction and lifting procedures previously described. Although the rib was less acute than that of panel (a) the film failed to lift from the surface.

(4) To produce a ribbed membrane from panel (b) after a 60 minute caustic soda/sodium nitrite etch. A panel was etched for 60 minutes. The panel was then anodized and the film produced was then subjected to the voltage reduction and lifting procedures previously described. The film produced lifted from the panels in whole sections even corresponding to the size of the panels.

Microscopic examination again showed that the caustic treatment had made the crests of the ribs sharper than previously. It was concluded that the microscopic smoothness of the machined panel is an important factor in determining the size of the anodic oxide membrane pieces that can be lifted from it.

(5) To produce a ribbed membrane from a panel b) that had been electro polished. The panel was electro polished using standard techniques. It was then anodized and the film produced was subjected to the voltage reduction and lifting procedure previously described. The film was observed to lift in large sections.

The electro polish had the effect of smoothing the aluminium and producing ribs whose crests were less sharp than previously.

We claim:

1. A porous anodic aluminium oxide membrane both surfaces of which are profiled on a scale of 0.1 to 10 mm.

2. A membrane as claimed in claim 1, wherein both surfaces are profiled by virtue of a plurality of interspersed peaks and valleys or dimples.

3. A membrane as claimed in claim 1, wherein the surfaces are profiled by virtue of alternating elongated ribs and troughs.

4. A membrane as claimed in claim 3, wherein the depths of the trough or troughs is at least 0.1 times the distance between adjacent peaks or ribs.

5. A membrane as claimed in claim 4, wherein the crests of the peaks or ribs and the bottoms of the valleys or troughs are rounded.

6. A filter structure comprising two anodic aluminium oxide membranes including one such membrane both surfaces of which comprise a plurality of alternating ribs and troughs, the distance between adjacent ribs being from 0.1 mm to 10 mm, and which is bonded to the other membrane along the crest of the ribs, wherein on or both membranes are porous.

7. A structure as claimed in claim 6, comprising two membranes each having alternating parallel elongated ribs and troughs and which are bonded together along the crests of their respective ribs.

8. A filter structure comprising a plurality of anodic aluminium oxide membranes stacked on on top of another, at least every second membrane being porous and having peaks or elongated ribs, the distance between adjacent peaks or ribs being from 0.1 mm to 10 mm, and being bonded to its neighbours at the peaks or along the crests of the ribs.

9. A structure as claimed in claim 8, wherein alternate membranes are flat and are porous or nonporous.

* * * * *